July 5, 1932.   C. CONE   1,865,836
PROCESS AND APPARATUS FOR PRODUCING SHEET GLASS
Filed June 11, 1930
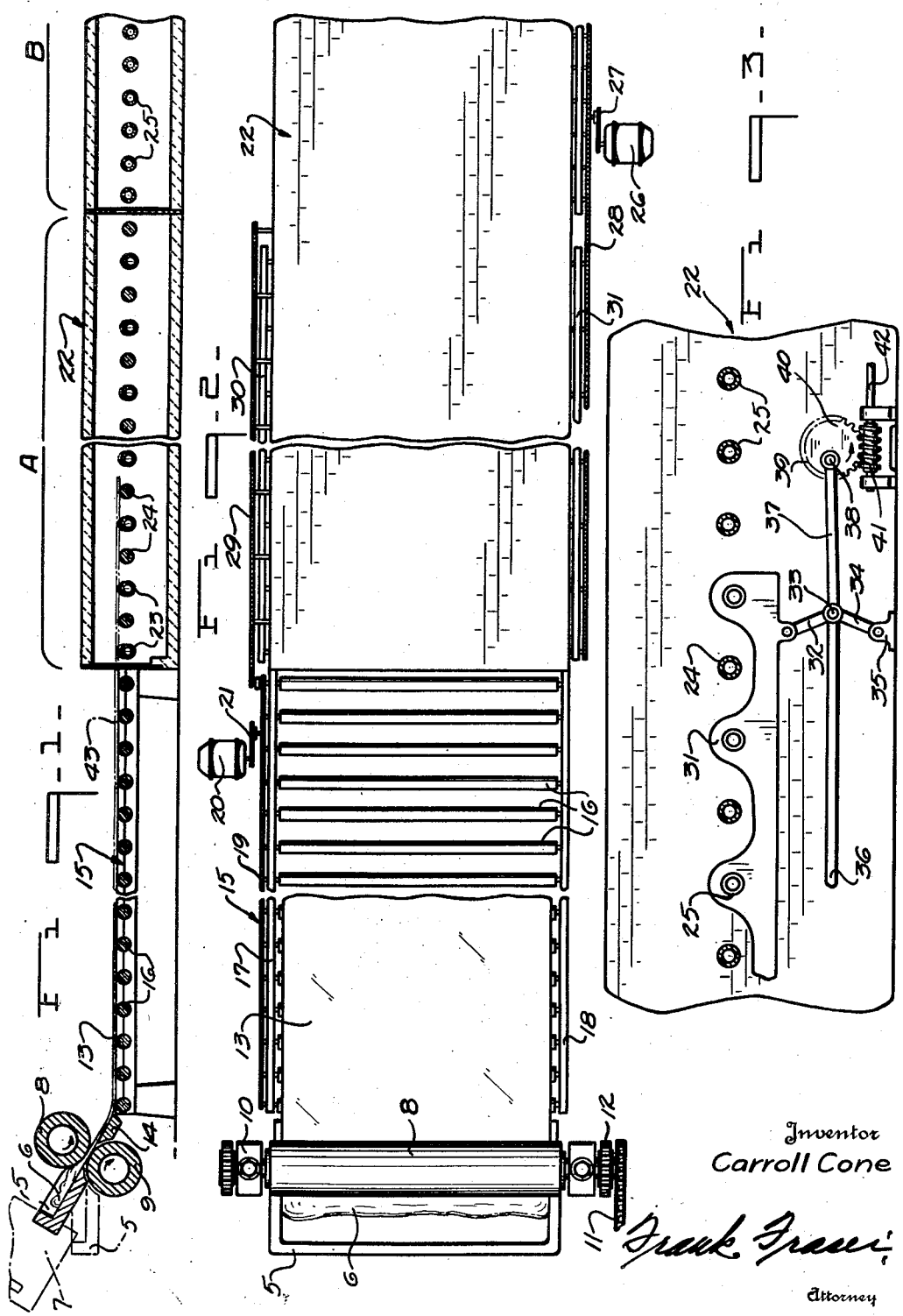
Inventor
Carroll Cone
Frank Frase
Attorney Patented July 5, 1932

1,865,836

UNITED STATES PATENT OFFICE

CARROLL CONE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed June 11, 1930. Serial No. 460,404.

The present invention relates to a process and apparatus for forming and annealing sheet or plate glass.

In the production of successive sheets of glass by an intermittent rolling operation, it is desirable that the formation of the sheet be performed at a relatively high rate of speed as compared to the speed at which it travels in annealing. This rapid formation of the glass sheet is desirable from both the standpoint of production and quality, while the travel of the sheet during annealing is necessarily slow in order to avoid making the annealing apparatus of great length.

An important object of the present invention resides in the provision of a process and apparatus whereby successive sheets of glass may be intermittently formed at a relatively high rate of speed and subsequently annealed while traveling at a relatively slower speed.

Another object of the invention is the provision of a process and apparatus for effecting a reduction in the speed of travel of the sheet as it is being carried forwardly whereby the movement of the sheet can be dropped from its relatively high forming speed to a relatively slower annealing speed in an easy, convenient, and efficient manner while, at the same time, maintaining it in constant forward motion.

A further object of the invention is the provision of a process and apparatus for effecting a reduction in the speed of travel of the sheet as it is being carried forwardly while providing maximum support for the sheet to prevent sagging thereof during its transfer from high forming speed to slow annealing speed.

Other objects and advantages of the invention will become more apparent during the course of the following description when taken in connection with the accompanying drawing.

In the drawing forming a part of this application and wherein like numerals are employed to designate like parts throughout the same, Fig. 1 is a vertical longitudinal section through apparatus provided by the present invention, Fig. 2 is a plan view thereof, and Fig. 3 is a side elevation of a portion of the annealing leer showing the means for effecting vertical movement of certain of the leer rolls.

Referring to the drawing, 5 designates a receiver or support adapted to receive thereupon a mass or charge of molten glass 6 from a pot or other suitable receptacle 7. The mass of molten glass 6 is supplied to the receiver when the same is in a substantially horizontal position such as indicated by the broken lines in Fig. 1, after which the pot 7 is removed and the receiver tilted upwardly to cause the molten glass to move downwardly between a pair of forming rolls 8 and 9. The forming rolls are spaced from one another to create a sheet forming pass therebetween and are mounted upon shafts rotatably supported at their opposite ends by bracket members 10.

As brought out above, it is desirable that the molten glass 6 be rapidly reduced to sheet form. The forming rolls 8 and 9 are consequently driven at a relatively high peripheral speed so that they will effect the rapid formation of the sheet. One of the forming rolls may be positively driven by suitable driving means 11 and the other roll driven from the first roll through intermeshing gears 12 mounted upon the roll shafts.

The glass sheet or plate being formed is indicated at 13 and the said sheet is supported as it leaves the forming rolls upon an inclined slab or chute 14. Associated with the chute 14 and adapted to receive the glass sheet or plate therefrom is a horizontal runway 15 composed of a series of horizontally aligned rolls 16 rotatably supported at their opposite ends by the side frames 17 and 18. The rolls 16 may be driven in any desired manner such as by associating with each roll a sprocket (not shown) and in training about all of the sprockets a single sprocket chain 19 driven from a motor 20 through suitable reduction gearing 21. The rolls 16 are constantly driven high speed rolls and travel at a speed equal to the speed of the forming rolls 8 and 9.

Arranged at the end of the runway 15 is an annealing leer 22 containing a large number of sheet supporting rolls which are divided into two units or sections A and B, the section A being termed the transfer or speed changing section and B the annealing section. The transfer section A is composed of a plurality of low speed rolls 23 driven at annealing speed and a plurality of high speed rolls 24 driven at rolling speed, the low speed rolls and high speed rolls being arranged alternately with one another as shown. The annealing section B of the leer is composed of a plurality of low speed rolls 25 arranged in horizontal alignment with the low speed rolls 23 when said low speed rolls are in their elevated or sheet supporting position, these rolls being vertically adjustable as a unit as will be more clearly hereinafter apparent.

The rolls 25 of annealing section B are driven at a constant annealing speed from a motor 26 through suitable reduction gearing 27 and chain and sprocket connections, the sprockets (not shown) being associated with the rolls and the sprocket chain 28 being trained thereabout. The high speed rolls 24 in transfer section A are driven from the motor 20 through a sprocket and chain drive 29, said motor also driving the runway rolls 16 as described above, while the low speed rolls 23 derive their motion from the motor 26 which also drives leer rolls 25. Of course, any desired type of drive for the various sets of rolls may be used.

According to the present invention, each of the low speed rolls 23 of section A is adapted to be positively driven at a relatively slow speed substantially equal to the speed of the rolls 25 in section B. The rolls 23 are also mounted so that they can be raised and lowered as a unit with respect to the high speed rolls 24, to the end that the low speed rolls can be moved into or out of driving contact with the sheet sufficiently to cause an increase or decrease in the speed of travel of the sheet while retaining at all times what may be termed a supporting contact therewith. The rolls 24 are constantly rotating high speed rolls and are maintained in a fixed position and in substantial horizontal alignment with the runway rolls 16 and slightly beneath the level of the low speed rolls 25. When the low speed rolls 23 are in their lowermost position, they are disposed slightly beneath the high speed rolls 24 and when in elevated position, are arranged slightly above the high speed rolls 24 and in horizontal alignment with the low speed rolls 25. When the low speed rolls 23 are in their lowered position, the major portion of the weight of the sheet rests upon rolls 24, although the low speed rolls are in such a position that they contact slightly with the sheet in order to provide what might be termed supporting contact therewith to prevent sagging thereof between the rolls. On the other hand, when the low speed rolls 23 are moved to their elevated position, they function to raise the sheet slightly so as to shift the major portion of the weight of the sheet from the high speed rolls 24 onto the low speed rolls, thereby effecting a reduction in the forward speed of travel of the sheet and also bringing the sheet into position where it can be moved forwardly onto leer rolls 25. However, while the major portion of the weight of the sheet may be removed from the high speed rolls 24, the said high speed rolls still have supporting contact with the sheet to prevent sagging thereof. In other words, the set of rolls supporting the major portion of the weight of the sheet determines the speed of travel of said sheet, while the other set of rolls have just sufficient contact with the sheet to prevent sagging thereof without effecting its forward speed of travel.

In Fig. 3 of the drawing, there is shown the means for raising and lowering the low speed rolls 23. These rolls project at their opposite ends beyond the side walls of the leer and are rotatably supported by the horizontal supporting members 30 and 31, said members being movable vertically to raise and lower the rolls carried thereby as a unit with respect to the rolls 24. This vertical adjustment may be achieved in any desired manner but as herein shown, for the purposes of illustration, each side member 30 and 31 has pivoted thereto adjacent each end thereof a depending link 32 pivotally connected with a shaft or pin 33 to which is also pivotally connected a second link 34, said link 34 being pivoted at its lower end to a fixed block 35. Connecting the pins 33 at the front and rear ends of each side member 30 and 31 is a rod 36, and pivotally associated with one of said pins 33 is a pitman 37 pivoted as at 38 to an eccentric 39, said eccentric carrying a gear 40 meshing with and driven from a worm 41 carried by drive shaft 42. Suitable means may be provided for connecting the raising and lowering mechanism at the opposite sides of the leer so that the opposite ends of the rolls will be raised and lowered simultaneously the same distance to maintain the said rolls always in a horizontal position.

When the low speed rolls 23 are in their lowered position as indicated by the full lines in Fig. 1 of the drawing, the parts of the raising and lowering mechanism assume the relative positions shown in Fig. 3. When it is desired to raise the rolls 23, however, the eccentric 39 is rotated in the direction indicated by the arrow so as to cause the links 32 and 34 to assume a more nearly vertical position, whereupon the rolls 23 will be moved upwardly.

When it is desired to form a glass sheet or plate 13 with the apparatus above described, the low speed rolls 23 are first lowered so that they are positioned slightly beneath the level of the high speed rolls 24. A mass of molten glass 6 is then deposited upon the receiver or support 5 and moved therefrom to the forming rolls 8 and 9 and reduced thereby to a sheet 13 at a relatively high rate of speed such as, for example, in the neighborhood of sixty feet per minute. During the formation of the sheet, the rolls 16 and 24 are positively driven at a speed equal to the speed of sheet formation, while the rolls 23 and 25 are positively driven at a much slower annealing speed which may be, for example, approximately five feet per minute. As the glass sheet leaves the forming rolls, it passes downwardly over the inclined chute 14 onto the runway rolls 16 and thence onto the rolls 24, the numeral 43 indicating, in broken lines, a sheet of glass passing from the runway 15 into the transfer section A of the leer. As the sheet passes into the transfer section A, the major portion of its weight will be supported upon the high speed rolls 24, although the low speed rolls 23 will engage the sheet slightly to provide supporting contact therewith. However, the weight of the sheet resting upon the low speed rolls will not be sufficient to cause the low speed rolls to have any material effect upon the forward movement of the sheet. As soon as the entire sheet is received upon the rolls 24, the low speed rolls 23 are raised a slight distance, sufficient to shift the major portion of the weight of the sheet from the high speed rolls 24 onto the low speed rolls 23. Inasmuch as the major portion of the weight of the sheet upon the rolls determines the speed at which said sheet travels, it will be seen that the transfer of the weight of the sheet from the high speed rolls to the low speed rolls will cause the forward travel of the sheet to be reduced to that of the low speed rolls, the low speed rolls then serving to advance the sheet forwardly at annealing speed into annealing section B, wherein it is received upon and carried along by rolls 25. While the low speed rolls 23 have been raised a degree sufficient to cause a reduction in the speed of travel of the sheet, the high speed rolls will still retain a slight contact with the sheet sufficient to support the same at points between the low speed rolls without materially affecting its speed of movement.

The sheet, after leaving the forming rolls and during its travel through the transfer section of the leer, is in a more or less plastic condition and consequently, if either of the rolls 23 or 24 were moved entirely out of contact with the sheet during the reduction in the speed of travel thereof, there would be a gap between adjacent rolls sufficient to permit a sagging of the sheet therebetween. The hereinabove described invention will overcome this objectionable feature and at the same time provide a means whereby the sheet may be formed at a relatively high rate of speed and transferred into an annealing leer at a relatively slower speed, the reduction in the speed of travel of the sheet being accomplished easily and conveniently and while maintaining the sheet in constant forward motion.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing sheet or plate glass, which consists in intermittently forming successive sheets of glass by a rolling operation, carrying each sheet forwardly upon a series of spaced movable supporting surfaces operating to advance the sheet at different speeds, in resting the major portion of the weight of the sheet upon certain of said surfaces to advance the sheet at one speed while retaining contact between the sheet and the remaining surfaces, and in then shifting the major portion of the weight of the sheet from the first mentioned surfaces to said last mentioned surfaces to vary the speed of travel thereof while maintaining all of said surfaces in contact with said sheet.

2. The process of producing sheet or plate glass, which consists in intermittently forming successive sheets of glass by a rolling operation, carrying each sheet forwardly upon a series of spaced movable supporting surfaces having driving contact with the sheet to move it forwardly at one speed, providing movable points of support for the sheet between the supporting surfaces having supporting contact only therewith, and in shifting the major portion of the weight of the sheet from the supporting surfaces to said points of support while maintaining said supporting surfaces in contact with the sheet so that the points of support have driving contact with the sheet to advance it at a different speed and the supporting surfaces supporting contact therewith only.

Signed at Toledo, in the county of Lucas and State of Ohio, this 6th day of June 1930.

CARROLL CONE.